US012313788B1

(12) United States Patent
Zhang et al.

(10) Patent No.: US 12,313,788 B1
(45) Date of Patent: May 27, 2025

(54) ULTRASHORT PULSES IN LiDAR SYSTEMS

(71) Applicant: INNOVUSION IRELAND LIMITED, Los Altos, CA (US)

(72) Inventors: Rui Zhang, Palo Alto, CA (US); Yimin Li, Cupertino, CA (US); Junwei Bao, Los Altos, CA (US)

(73) Assignee: SEYOND, INC., Sunnyvale, CA (US)

( * ) Notice: Subject to any disclaimer, the term of this patent is extended or adjusted under 35 U.S.C. 154(b) by 635 days.

(21) Appl. No.: 16/595,904

(22) Filed: Oct. 8, 2019

Related U.S. Application Data

(60) Provisional application No. 62/743,367, filed on Oct. 9, 2018.

(51) Int. Cl.
*G01S 7/484* (2006.01)
*G01S 7/4861* (2020.01)
*G01S 7/4865* (2020.01)
*G01S 7/487* (2006.01)

(52) U.S. Cl.
CPC ............ *G01S 7/484* (2013.01); *G01S 7/4861* (2013.01); *G01S 7/4865* (2013.01); *G01S 7/4873* (2013.01)

(58) Field of Classification Search
CPC ...... G01S 7/484; G01S 7/4861; G01S 7/4865; G01S 7/4873
See application file for complete search history.

(56) References Cited

U.S. PATENT DOCUMENTS

| 3,897,150 A | 7/1975 | Bridges et al. |
| 4,464,048 A | 8/1984 | Farlow |
| 4,923,263 A | 5/1990 | Johnson |
| 5,006,721 A | 4/1991 | Cameron et al. |
| 5,157,451 A | 10/1992 | Taboada |
| 5,319,434 A | 6/1994 | Croteau et al. |
| 5,369,661 A | 11/1994 | Yamaguchi et al. |
| 5,442,358 A | 8/1995 | Keeler et al. |
| 5,546,188 A | 8/1996 | Wangler et al. |
| 5,579,153 A | 11/1996 | Laming et al. |
| 5,657,077 A | 8/1997 | Deangelis et al. |
| 5,793,491 A | 8/1998 | Wangler et al. |
| 5,838,239 A | 11/1998 | Stern et al. |
| 5,864,391 A | 1/1999 | Hosokawa et al. |
| 5,926,259 A | 7/1999 | Bamberger et al. |
| 5,936,756 A | 8/1999 | Nakajima |

(Continued)

FOREIGN PATENT DOCUMENTS

| CN | 1677050 A | 10/2005 |
| CN | 204758260 U | 11/2015 |

(Continued)

OTHER PUBLICATIONS

Chen, X, et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.

(Continued)

*Primary Examiner* — Isam A Alsomiri
*Assistant Examiner* — Sanjida Naser
(74) *Attorney, Agent, or Firm* — MASCHOFF BRENNAN; Liang Huang

(57) ABSTRACT

LiDAR system and methods discussed herein use ultrafast light pulses. Use of ultrafast light pulses can result in reduced power consumption compared to longer length or conventional light pulses.

22 Claims, 10 Drawing Sheets

(56) References Cited

U.S. PATENT DOCUMENTS

| | | | |
|---|---|---|---|
| 6,163,378 A | 12/2000 | Khoury |
| 6,317,202 B1 | 11/2001 | Hosokawa et al. |
| 6,594,000 B2 | 7/2003 | Green et al. |
| 6,650,404 B1 | 11/2003 | Crawford |
| 6,950,733 B2 | 9/2005 | Stopczynski |
| 7,128,267 B2 | 10/2006 | Reichenbach et al. |
| 7,202,941 B2 | 4/2007 | Munro |
| 7,345,271 B2 | 3/2008 | Boehlau et al. |
| 7,382,442 B2 | 6/2008 | Adachi et al. |
| 7,440,084 B2 | 10/2008 | Kane |
| 7,440,175 B2 | 10/2008 | Di et al. |
| 7,489,865 B2 | 2/2009 | Varshneya et al. |
| 7,502,395 B2 | 3/2009 | Cheng et al. |
| 7,508,496 B2 | 3/2009 | Mettenleiter et al. |
| 7,576,837 B2 | 8/2009 | Liu et al. |
| 7,583,364 B1 | 9/2009 | Mayor et al. |
| 7,830,527 B2 | 11/2010 | Chen et al. |
| 7,835,068 B1 | 11/2010 | Brooks et al. |
| 7,847,235 B2 | 12/2010 | Krupkin et al. |
| 7,880,865 B2 | 2/2011 | Tanaka et al. |
| 7,936,448 B2 | 5/2011 | Albuquerque et al. |
| 7,969,558 B2 | 6/2011 | Hall |
| 7,982,861 B2 | 7/2011 | Abshire et al. |
| 8,072,582 B2 | 12/2011 | Meneely |
| 8,471,895 B2 | 6/2013 | Banks |
| 8,736,818 B2 | 5/2014 | Weimer et al. |
| 8,749,764 B2 | 6/2014 | Hsu |
| 8,812,149 B2 | 8/2014 | Doak |
| 8,994,928 B2 | 3/2015 | Shiraishi |
| 9,041,762 B2 | 5/2015 | Bai et al. |
| 9,048,616 B1 | 6/2015 | Robinson |
| 9,065,243 B2 | 6/2015 | Asobe et al. |
| 9,086,273 B1 | 7/2015 | Gruver et al. |
| 9,121,703 B1 | 9/2015 | Droz et al. |
| 9,194,701 B2 | 11/2015 | Bosch |
| 9,255,790 B2 | 2/2016 | Zhu |
| 9,300,321 B2 | 3/2016 | Zalik et al. |
| 9,304,316 B2 | 4/2016 | Weiss et al. |
| 9,316,724 B2 | 4/2016 | Gehring et al. |
| 9,354,485 B2 | 5/2016 | Fermann et al. |
| 9,510,505 B2 | 12/2016 | Halloran et al. |
| 9,575,184 B2 | 2/2017 | Gilliland et al. |
| 9,605,998 B2 | 3/2017 | Nozawa |
| 9,621,876 B2 | 4/2017 | Federspiel |
| 9,638,799 B2 | 5/2017 | Goodwin et al. |
| 9,696,426 B2 | 7/2017 | Zuk |
| 9,702,966 B2 | 7/2017 | Batcheller et al. |
| 9,804,264 B2 | 10/2017 | Villeneuve et al. |
| 9,810,786 B1 | 11/2017 | Welford et al. |
| 9,812,838 B2 | 11/2017 | Villeneuve et al. |
| 9,823,353 B2 | 11/2017 | Eichenholz et al. |
| 9,857,468 B1 | 1/2018 | Eichenholz et al. |
| 9,869,754 B1 | 1/2018 | Campbell et al. |
| 9,880,263 B2 | 1/2018 | Droz et al. |
| 9,880,278 B2 | 1/2018 | Uffelen et al. |
| 9,885,778 B2 | 2/2018 | Dussan |
| 9,897,689 B2 | 2/2018 | Dussan |
| 9,915,726 B2 | 3/2018 | Bailey et al. |
| 9,927,915 B2 | 3/2018 | Frame et al. |
| 9,958,545 B2 | 5/2018 | Eichenholz et al. |
| 10,007,001 B1 | 6/2018 | LaChapelle et al. |
| 10,012,732 B2 | 7/2018 | Eichenholz et al. |
| 10,042,159 B2 | 8/2018 | Dussan et al. |
| 10,061,019 B1 | 8/2018 | Campbell et al. |
| 10,073,166 B2 | 9/2018 | Dussan |
| 10,078,133 B2 | 9/2018 | Dussan |
| 10,094,925 B1 | 10/2018 | LaChapelle |
| 10,157,630 B2 | 12/2018 | Vaughn et al. |
| 10,185,027 B2 | 1/2019 | O'Keeffe |
| 10,191,155 B2 | 1/2019 | Curatu |
| 10,215,847 B2 | 2/2019 | Scheim et al. |
| 10,267,898 B2 | 4/2019 | Campbell et al. |
| 10,295,656 B1 | 5/2019 | Li et al. |
| 10,310,058 B2 | 6/2019 | Campbell et al. |
| 10,324,170 B1 | 6/2019 | Enberg, Jr. et al. |
| 10,324,185 B2 | 6/2019 | McWhirter et al. |
| 10,393,877 B2 | 8/2019 | Hall et al. |
| 10,422,865 B2 | 9/2019 | Irish et al. |
| 10,429,495 B1 | 10/2019 | Wang et al. |
| 10,444,356 B2 | 10/2019 | Wu et al. |
| 10,451,716 B2 | 10/2019 | Hughes et al. |
| 10,466,342 B1 | 11/2019 | Zhu et al. |
| 10,502,831 B2 | 12/2019 | Eichenholz |
| 10,509,112 B1 | 12/2019 | Pan |
| 10,520,602 B2 | 12/2019 | Villeneuve et al. |
| 10,557,923 B2 | 2/2020 | Watnik et al. |
| 10,571,567 B2 | 2/2020 | Campbell et al. |
| 10,578,720 B2 | 3/2020 | Hughes et al. |
| 10,591,600 B2 | 3/2020 | Villeneuve et al. |
| 10,627,491 B2 | 4/2020 | Hall et al. |
| 10,641,872 B2 | 5/2020 | Dussan et al. |
| 10,663,564 B2 | 5/2020 | LaChapelle |
| 10,663,585 B2 | 5/2020 | McWhirter |
| 10,663,596 B2 | 5/2020 | Dussan et al. |
| 10,684,360 B2 | 6/2020 | Campbell |
| 10,732,281 B2 * | 8/2020 | LaChapelle ............ G01S 7/497 |
| 10,908,262 B2 | 2/2021 | Dussan |
| 10,908,265 B2 | 2/2021 | Dussan |
| 10,908,268 B2 | 2/2021 | Zhou et al. |
| 10,969,475 B2 | 4/2021 | Li et al. |
| 10,983,218 B2 | 4/2021 | Hall et al. |
| 11,002,835 B2 | 5/2021 | Pan et al. |
| 11,009,605 B2 | 5/2021 | Li et al. |
| 11,016,192 B2 | 5/2021 | Pacala et al. |
| 11,022,689 B2 | 6/2021 | Villeneuve et al. |
| 11,035,935 B2 | 6/2021 | Hinderling |
| 11,194,048 B1 | 12/2021 | Burbank et al. |
| 2002/0136251 A1 | 9/2002 | Green et al. |
| 2004/0135992 A1 | 7/2004 | Munro |
| 2005/0033497 A1 | 2/2005 | Stopczynski |
| 2005/0190424 A1 | 9/2005 | Reichenbach et al. |
| 2005/0195383 A1 | 9/2005 | Breed et al. |
| 2006/0071846 A1 | 4/2006 | Yanagisawa et al. |
| 2006/0132752 A1 | 6/2006 | Kane |
| 2007/0091948 A1 | 4/2007 | Di et al. |
| 2007/0216995 A1 | 9/2007 | Bollond et al. |
| 2008/0174762 A1 | 7/2008 | Liu et al. |
| 2008/0193135 A1 | 8/2008 | Du et al. |
| 2009/0010644 A1 | 1/2009 | Varshneya et al. |
| 2009/0051926 A1 | 2/2009 | Chen |
| 2009/0059201 A1 | 3/2009 | Willner et al. |
| 2009/0067453 A1 | 3/2009 | Mizuuchi et al. |
| 2009/0147239 A1 | 6/2009 | Zhu |
| 2009/0262760 A1 | 10/2009 | Krupkin et al. |
| 2009/0316134 A1 | 12/2009 | Michael et al. |
| 2010/0006760 A1 | 1/2010 | Lee et al. |
| 2010/0020306 A1 | 1/2010 | Hall |
| 2010/0020377 A1 | 1/2010 | Borchers et al. |
| 2010/0027602 A1 | 2/2010 | Abshire et al. |
| 2010/0045965 A1 * | 2/2010 | Meneely ................ G01S 17/10 356/5.01 |
| 2010/0053715 A1 | 3/2010 | O'Neill et al. |
| 2010/0128109 A1 | 5/2010 | Banks |
| 2010/0271614 A1 | 10/2010 | Albuquerque et al. |
| 2011/0181864 A1 | 7/2011 | Schmitt et al. |
| 2012/0038903 A1 | 2/2012 | Weimer et al. |
| 2012/0124113 A1 | 5/2012 | Zalik et al. |
| 2012/0221142 A1 | 8/2012 | Doak |
| 2013/0107016 A1 | 5/2013 | Federspiel |
| 2013/0116971 A1 | 5/2013 | Retkowski et al. |
| 2013/0241761 A1 | 9/2013 | Cooper et al. |
| 2013/0293867 A1 | 11/2013 | Hsu et al. |
| 2013/0293946 A1 | 11/2013 | Fermann et al. |
| 2013/0329279 A1 | 12/2013 | Nati et al. |
| 2013/0342822 A1 | 12/2013 | Shiraishi |
| 2014/0078514 A1 | 3/2014 | Zhu |
| 2014/0104594 A1 | 4/2014 | Gammenthaler |
| 2014/0347650 A1 | 11/2014 | Bosch |
| 2014/0350836 A1 | 11/2014 | Stettner et al. |
| 2015/0078123 A1 | 3/2015 | Batcheller et al. |
| 2015/0084805 A1 | 3/2015 | Dawber |
| 2015/0109603 A1 | 4/2015 | Kim et al. |
| 2015/0116692 A1 | 4/2015 | Zuk et al. |
| 2015/0139259 A1 | 5/2015 | Robinson |

(56) References Cited

U.S. PATENT DOCUMENTS

| | | |
|---|---|---|
| 2015/0158489 A1 | 6/2015 | Oh et al. |
| 2015/0338270 A1 | 11/2015 | Williams et al. |
| 2015/0355327 A1 | 12/2015 | Goodwin et al. |
| 2016/0003946 A1 | 1/2016 | Gilliland et al. |
| 2016/0006914 A1 | 1/2016 | Neumann |
| 2016/0047896 A1 | 2/2016 | Dussan |
| 2016/0047900 A1 | 2/2016 | Dussan |
| 2016/0061655 A1 | 3/2016 | Nozawa |
| 2016/0061935 A1 | 3/2016 | Mccloskey et al. |
| 2016/0100521 A1 | 4/2016 | Halloran et al. |
| 2016/0117048 A1 | 4/2016 | Frame et al. |
| 2016/0172819 A1 | 6/2016 | Ogaki |
| 2016/0178736 A1 | 6/2016 | Chung |
| 2016/0226210 A1 | 8/2016 | Zayhowski et al. |
| 2016/0245902 A1 | 8/2016 | Natnik |
| 2016/0291134 A1 | 10/2016 | Droz et al. |
| 2016/0313445 A1 | 10/2016 | Bailey et al. |
| 2016/0327646 A1 | 11/2016 | Scheim et al. |
| 2017/0003116 A1 | 1/2017 | Yee et al. |
| 2017/0153319 A1 | 6/2017 | Villeneuve et al. |
| 2017/0219695 A1* | 8/2017 | Hall .................. G01S 7/4815 |
| 2017/0242104 A1 | 8/2017 | Dussan |
| 2017/0299721 A1 | 10/2017 | Eichenholz et al. |
| 2017/0307738 A1 | 10/2017 | Schwarz et al. |
| 2017/0328991 A1* | 11/2017 | Yates .................. G01S 7/4865 |
| 2017/0365105 A1 | 12/2017 | Rao et al. |
| 2018/0040171 A1 | 2/2018 | Kundu et al. |
| 2018/0050704 A1 | 2/2018 | Tascione et al. |
| 2018/0069367 A1 | 3/2018 | Villeneuve et al. |
| 2018/0152691 A1 | 5/2018 | Pacala et al. |
| 2018/0158471 A1 | 6/2018 | Vaughn et al. |
| 2018/0164439 A1 | 6/2018 | Droz et al. |
| 2018/0156896 A1 | 7/2018 | O'Keeffe |
| 2018/0188355 A1 | 7/2018 | Bao et al. |
| 2018/0188357 A1 | 7/2018 | Li et al. |
| 2018/0188358 A1 | 7/2018 | Li et al. |
| 2018/0188371 A1 | 7/2018 | Bao et al. |
| 2018/0210084 A1 | 7/2018 | Zwölfer et al. |
| 2018/0275274 A1 | 9/2018 | Bao et al. |
| 2018/0284241 A1 | 10/2018 | Campbell et al. |
| 2018/0284242 A1 | 10/2018 | Campbell |
| 2018/0284286 A1 | 10/2018 | Eichenholz et al. |
| 2018/0329060 A1 | 11/2018 | Pacala et al. |
| 2018/0359460 A1 | 12/2018 | Pacala et al. |
| 2019/0025428 A1 | 1/2019 | Li et al. |
| 2019/0107607 A1 | 4/2019 | Danziger |
| 2019/0107623 A1 | 4/2019 | Campbell et al. |
| 2019/0120942 A1 | 4/2019 | Zhang et al. |
| 2019/0120962 A1 | 4/2019 | Gimpel et al. |
| 2019/0154804 A1 | 5/2019 | Eichenholz |
| 2019/0154807 A1 | 5/2019 | Steinkogler et al. |
| 2019/0212416 A1 | 7/2019 | Li et al. |
| 2019/0250254 A1 | 8/2019 | Campbell et al. |
| 2019/0257924 A1 | 8/2019 | Li et al. |
| 2019/0265334 A1 | 8/2019 | Zhang et al. |
| 2019/0265336 A1 | 8/2019 | Zhang et al. |
| 2019/0265337 A1 | 8/2019 | Zhang et al. |
| 2019/0265339 A1 | 8/2019 | Zhang et al. |
| 2019/0277952 A1 | 9/2019 | Beuschel et al. |
| 2019/0310368 A1 | 10/2019 | LaChapelle |
| 2019/0369215 A1 | 12/2019 | Wang et al. |
| 2019/0369258 A1 | 12/2019 | Hall et al. |
| 2019/0383915 A1 | 12/2019 | Li et al. |
| 2020/0142070 A1 | 5/2020 | Hall et al. |
| 2020/0256964 A1 | 8/2020 | Campbell et al. |
| 2020/0284906 A1 | 9/2020 | Eichenholz et al. |
| 2020/0319310 A1 | 10/2020 | Hall et al. |
| 2020/0400798 A1 | 12/2020 | Rezk et al. |
| 2021/0088630 A9 | 3/2021 | Zhang |
| 2022/0390572 A1* | 12/2022 | Russell .................. G01S 7/4817 |

FOREIGN PATENT DOCUMENTS

| | | |
|---|---|---|
| CN | 204885804 U | 12/2015 |
| CN | 108132472 A | 6/2018 |
| CN | 207457508 U | 6/2018 |
| CN | 207557465 U | 6/2018 |
| CN | 208314210 U | 1/2019 |
| CN | 208421228 U | 1/2019 |
| CN | 208705506 U | 4/2019 |
| CN | 10659747 B | 5/2019 |
| CN | 209280923 U | 8/2019 |
| CN | 108445468 B | 11/2019 |
| CN | 110031823 B | 3/2020 |
| CN | 108089201 B | 4/2020 |
| CN | 109116331 B | 4/2020 |
| CN | 109917408 B | 4/2020 |
| CN | 109116366 B | 5/2020 |
| CN | 109116367 B | 5/2020 |
| CN | 110031822 B | 5/2020 |
| CN | 211655309 U | 10/2020 |
| CN | 109188397 B | 11/2020 |
| CN | 109814086 B | 11/2020 |
| CN | 109917348 B | 11/2020 |
| CN | 110492856 B | 11/2020 |
| CN | 110736975 B | 11/2020 |
| CN | 109725320 B | 12/2020 |
| CN | 110780284 B | 12/2020 |
| CN | 110780283 B | 1/2021 |
| CN | 110784220 B | 2/2021 |
| CN | 212623082 U | 2/2021 |
| CN | 110492349 B | 3/2021 |
| CN | 109950784 B | 5/2021 |
| CN | 213182011 U | 5/2021 |
| CN | 213750313 U | 7/2021 |
| CN | 214151038 U | 9/2021 |
| CN | 109814082 B | 10/2021 |
| CN | 113491043 A | 10/2021 |
| CN | 214795200 U | 11/2021 |
| CN | 214795206 U | 11/2021 |
| CN | 214895784 U | 11/2021 |
| CN | 214895810 U | 11/2021 |
| CN | 215641806 U | 1/2022 |
| CN | 112639527 B | 2/2022 |
| CN | 215932142 U | 3/2022 |
| CN | 112578396 B | 4/2022 |
| EP | 0 757 257 B1 | 2/1997 |
| EP | 1 237 305 A2 | 9/2002 |
| EP | 1 923 721 A1 | 5/2008 |
| EP | 2 157 445 A2 | 2/2010 |
| EP | 2 395 368 A1 | 12/2011 |
| EP | 2 889 642 A1 | 7/2015 |
| GB | 1 427 164 A | 3/1976 |
| GB | 2000411 | 1/1979 |
| JP | 2007144667 A | 6/2007 |
| JP | 2010035385 A | 2/2010 |
| JP | 2017-003347 A | 1/2017 |
| JP | 2017-138301 A | 8/2017 |
| KR | 10-2010-0096931 | 9/2010 |
| KR | 10-2012-0013515 A | 2/2012 |
| KR | 10-2013-0068224 A | 6/2013 |
| KR | 10-2018-0107673 A | 10/2018 |
| WO | 02/101408 A1 | 12/2002 |
| WO | 2017/110417 A1 | 6/2017 |
| WO | 2018/125725 A1 | 7/2018 |
| WO | 2018126248 A1 | 7/2018 |
| WO | 2018129408 A1 | 7/2018 |
| WO | 2018129409 A1 | 7/2018 |
| WO | 2018129410 A1 | 7/2018 |
| WO | 2018175990 | 9/2018 |
| WO | 2018182812 A2 | 10/2018 |
| WO | 2019079642 | 4/2019 |
| WO | 2019165095 | 8/2019 |
| WO | 2019165289 A1 | 8/2019 |
| WO | 2019165294 | 8/2019 |
| WO | 2020013890 A2 | 1/2020 |

OTHER PUBLICATIONS

Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., 6 pages.

(56) References Cited

OTHER PUBLICATIONS

International Preliminary Report on Patentability, dated Jul. 9, 2019, for International Application No. PCT/US2018/012703, 10 pages.
International Preliminary Report on Patentability, dated Jul. 9, 2019, for International Application No. PCT/US2018/012704, 7 pages.
International Preliminary Report on Patentability, dated Jul. 9, 2019, for International Application No. PCT/US2018/012705, 7 pages.
International Search Report and Written Opinion, dated Jan. 17, 2020, for International Application No. PCT/US2019/019276, 14 pages.
International Search Report and Written Opinion, dated Jul. 9, 2019, for International Application No. PCT/US2019/018987, 17 pages.
International Search Report and Written Opinion, dated Sep. 18, 2018, for International Application No. PCT/US2018/012116, 12 pages.
International Search Report and Written Opinion, dated May 3, 2019, for International Application No. PCT/US2019/019272, 16 pages.
International Search Report and Written Opinion, dated May 6, 2019, for International Application No. PCT/US2019/019264, 15 pages.
International Search Report and Written Opinion, dated Jan. 3, 2019, for International Application No. PCT/US2018/056577, 15 pages.
International Search Report and Written Opinion, dated Mar. 23, 2018, for International Application No. PCT/US2018/012704, 12 pages.
International Search Report and Written Opinion, dated Jun. 7, 2018, for International Application No. PCT/US2018/024185, 9 pages.
International Preliminary Report on Patentability, dated Apr. 30, 2020, for International Application No. PCT/US2018/056577, 8 pages.
European Search Report, dated Jul. 17, 2020, for EP Application No. 18776977.3, 12 pages.
Extended European Search Report, dated Jul. 10, 2020, for EP Application No. 18736738.8, 9 pages.
Gunzung, Kim, et al. (Mar. 2, 2016). "A hybrid 3D LIDAR imager based on pixel-by-pixel scanning and DS-OCDMA," pages Proceedings of SPIE [Proceedings of SPIE ISSN 0277-786X vol. 10524], SPIE, US, vol. 9751, pp. 975119-975119-8.
Extended European Search Report, dated Jul. 22, 2020, for EP Application No. 18736685.1, 10 pages.
Gluckman, J. (May 13, 2016). "Design of the processing chain for a high-altitude, airborne, single-photon lidar mapping instrument," Proceedings of SPIE; [Proceedings of SPIE ISSN 0277-786X vol. 10524], SPIE, US, vol. 9832, 9 pages.
Office Action Issued in Japanese Patent Application No. 2019-536019 dated Nov. 30, 2021, 6 pages.
European Search Report, dated Jun. 17, 2021, for EP Application No. 18868896.4, 7 pages.
"Fiber laser," Wikipedia, https://en.wikipedia.org/wiki/Fiber_laser, 6 pages.
International Search Report and Written Opinion, dated Mar. 19, 2018, for International Application No. PCT/US2018/012705, 12 pages.
International Search Report and Written Opinion, dated Mar. 20, 2018, for International Application No. PCT/US2018/012703, 13 pages.
"Mirrors", Physics LibreTexts, https://phys.libretexts.org/Bookshelves/Optics/Supplemental_Modules_(Components)/Mirrors, (2021), 2 pages.
"Why Wavelengths Matter in Fiber Optics", FirstLight, https://www.firstlight.net/why-wavelengths-matter-in-fiber-optics/, (2021), 5 pages.

* cited by examiner

ULTRASHORT PULSES IN LiDAR SYSTEMS

This application claims the benefit of U.S. Provisional Application No. 62/743,367, filed Oct. 9, 2018, the disclosure of which is incorporated herein in its entirety.

FIELD

This disclosure relates generally to laser scanning and, more particularly, to using ultrashort light pulses in laser scanning systems.

BACKGROUND

Light detection and ranging (LiDAR) systems use light pulses to create an image or point cloud of the external environment. Some typical LiDAR systems include a light source, a pulse steering system, and light detector. The light source generates light pulses that are directed by the pulse steering system in particular directions when being transmitted from the LiDAR system. When a transmitted light pulse is scattered by an object, some of the scattered light is returned to the LiDAR system as a returned pulse. The light detector detects the returned pulse. Using the time it took for the returned pulse to be detected after the light pulse was transmitted and the speed of light, the LiDAR system can determine the distance to the object along the path of the transmitted light pulse. The pulse steering system can direct light pulses along different paths to allow the LiDAR system to scan the surrounding environment and produce an image or point cloud. LiDAR systems can also use techniques other than time-of-flight and scanning to measure the surrounding environment.

SUMMARY

LiDAR system and methods discussed herein use ultrafast light pulses. Use of ultrafast light pulses can result in reduced power consumption compared to longer length or conventional light pulses.

In one embodiment, a LiDAR system is provided that can include a light source operative to output a plurality of light pulses; a controller operative to control pulse duration of each of the light pulses and to control a time delay between successively output light pulses, wherein the pulse duration of each of the light pulses is characterized as an ultrashort pulse; a steering system operative to control a scanning direction of each ultrashort light pulse to particular location within a LiDAR FOV; and a detection system operative to monitor for returned ultrashort pulses.

In another embodiment, a method for using a LIDAR system is provided for transmitting a plurality of ultrashort light pulses to a steering system that redirects the light pulses to a LiDAR field of view, wherein a time delay between successively ultrashort light pulses is varied; receiving, via a detection system, light energy signals comprising noise and returned ultrashort pulses; determining a time interval between successively received light energy signals; and correlating the determined time interval with the time delay to distinguish between noise and returned ultrashort pulses.

In yet another embodiment, a method for using a LiDAR system is provided for transmitting a plurality of ultrashort light pulses to a steering system that redirects the light pulses to a LiDAR field of view; receiving, via a detection system, light energy signals comprising noise and returned ultrashort pulses, wherein each received light energy signal produces an analog intensity level; converting the analog intensity level to a digital intensity level; and comparing the digital intensity level to a threshold to distinguish between noise and returned ultrashort pulses.

In yet another embodiment, a method for using a LiDAR system is provided for transmitting a plurality of ultrashort light pulses to a steering system that redirects the light pulses to a LiDAR field of view; receiving, via a detection system, light energy signals comprising noise and returned ultrashort pulses, wherein each received light energy signal produces an analog intensity level; converting the analog intensity level to a digital intensity level; and comparing the digital intensity level to a threshold to distinguish between noise and returned ultrashort pulses.

In yet another embodiment, a method for using a LiDAR system is provided for transmitting a plurality of ultrashort light pulses to a steering system that redirects the light pulses to a LIDAR field of view, wherein each transmitted ultrashort light pulse corresponds to a reference clock; receiving, via a detection system, light energy signals, wherein each received light energy signal produces a current level; converting the current level to a square wave signal; and comparing the square wave signal to the reference clock pulse to obtain a time delay between transmission of an ultrashort light pulse and a return of that particular ultrashort light pulse.

BRIEF DESCRIPTION OF THE DRAWINGS

The present application can be best understood by reference to the figures described below taken in conjunction with the accompanying drawing figures, in which like parts may be referred to by like numerals.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some light detection and ranging (LiDAR) systems using a single light source to produce pulse of a single wavelength that scan the surrounding environment. The pulses are scanned using steering systems direct the pulses in one or two dimensions to cover an area of the surround environment (the scan area). When these systems use mechanical means to direct the pulses, the system complexity increases because more moving parts are required. Additionally, only a single pulse can be emitted at any one time because two or more identical pulses would introduce ambiguity in returned pulses. In some embodiments of the present technology, these disadvantages and/or others are overcome.

For example, some embodiments of the present technology use two light sources that produce pulses of different wavelengths. These light sources provide the pulses to a pulse steering system at different angles so that the scan area for each light source is different. This allows for tuning the light source to appropriate powers and the possibility of having overlapping scan areas that cover scans of different distances. Longer ranges can be scanned with pulses having higher power and/or slower repetition rate. Shorter ranges can be scanned with pulses having lower power and/or high repetition rate to increase point density.

As another example, some embodiments of the present technology use pulse steering systems with one or more dispersion elements (e.g., gratings, optical combs, prisms, etc.) to direct pulses based on the wavelength of the pulse. A dispersion element can make fine adjustments to a pulse's optical path, which may be difficult or impossible with mechanical systems. Additionally, using one or more dispersion elements allows the pulse steering system to use few mechanical components to achieve the desired scanning capabilities. This results in a simpler, more efficient (e.g., lower power) design that is potentially more reliable (due to few moving components).

Figure 1:
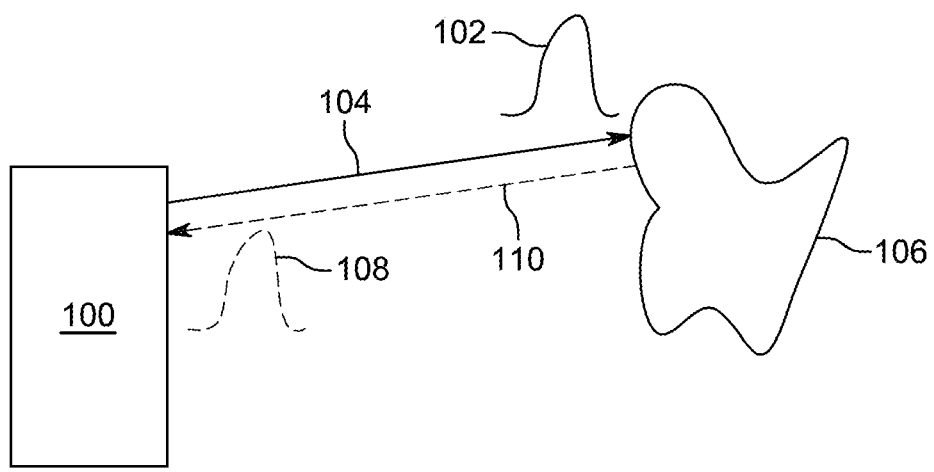
FIGS. 1-3 illustrate an exemplary LiDAR system using pulse signal to measure distances to points in the outside environment.

Some LiDAR systems use the time-of-flight of light signals (e.g., light pulses) to determine the distance to objects in the path of the light. For example, with respect to FIG. 1, an exemplary LiDAR system 100 includes a laser light source (e.g., a fiber laser), a steering system (e.g., a system of one or more moving mirrors), and a light detector (e.g., a photon detector with one or more optics). LiDAR system 100 transmits light pulse 102 along path 104 as determined by the steering system of LiDAR system 100. In the depicted example, light pulse 102, which is generated by the laser light source, is a short pulse of laser light. Further, the signal steering system of the LiDAR system 100 is a pulse signal steering system. However, it should be appreciated that LiDAR systems can operate by generating, transmitting, and detecting light signals that are not pulsed and/use derive ranges to object in the surrounding environment using techniques other than time-of-flight. For example, some LiDAR systems use frequency modulated continuous waves (i.e., "FMCW"). It should be further appreciated that any of the techniques described herein with respect to time-of-flight based systems that use pulses also may be applicable to LiDAR systems that do not use one or both of these techniques.

Referring back to FIG. 1 (a time-of-flight LiDAR system that uses light pulses) when light pulse 102 reaches object 106, light pulse 102 scatters and returned light pulse 108 will be reflected back to system 100 along path 110. The time from when transmitted light pulse 102 leaves LiDAR system 100 to when returned light pulse 108 arrives back at LiDAR system 100 can be measured (e.g., by a processor or other electronics within the LiDAR system). This time-of-flight combined with the knowledge of the speed of light can be used to determine the range/distance from LiDAR system 100 to the point on object 106 where light pulse 102 scattered.

Figure 2:
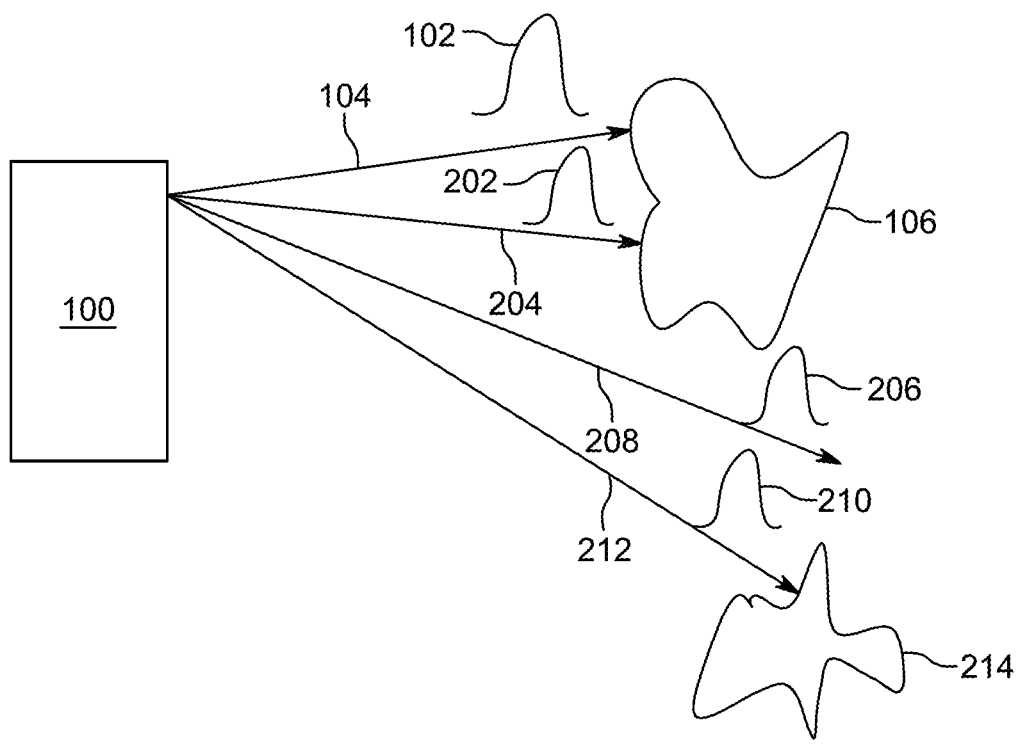
Figure 3:
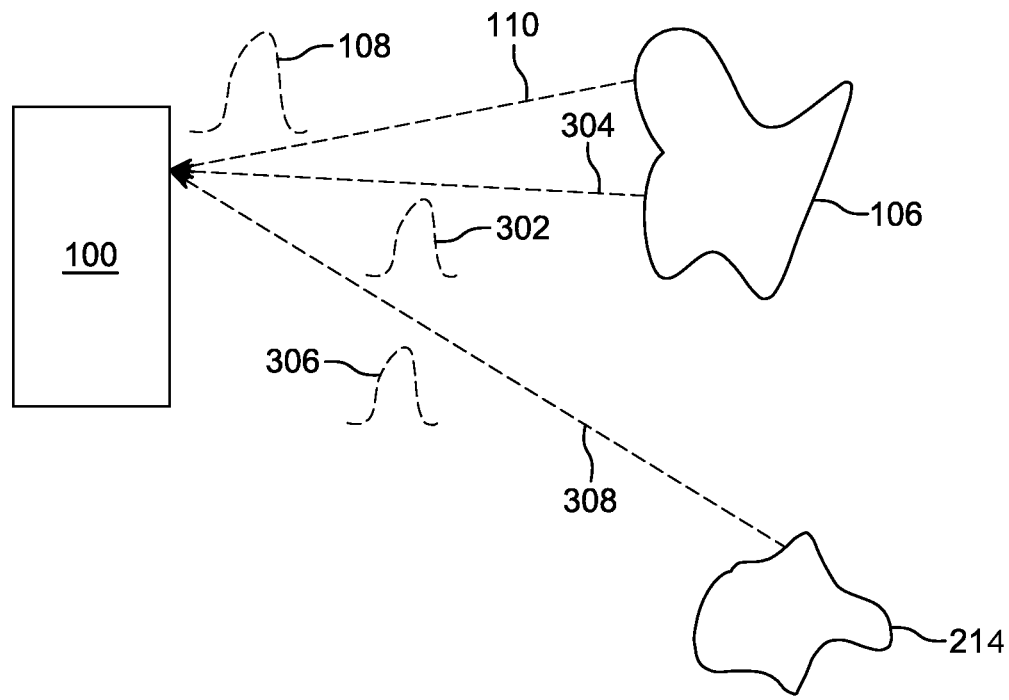

By directing many light pulses, as depicted in FIG. 2, LiDAR system 100 scans the external environment (e.g., by directing light pulses 102, 202, 206, 210 along paths 104, 204, 208, 212, respectively). As depicted in FIG. 3, LiDAR system 100 receives returned light pulses 108, 302, 306 (which correspond to transmitted light pulses 102, 202, 210, respectively) back after objects 106 and 214 scatter the transmitted light pulses and reflect pulses back along paths 110, 304, 308, respectively. Based on the direction of the transmitted light pulses (as determined by LiDAR system 100) as well as the calculated range from LiDAR system 100 to the points on objects that scatter the light pulses (e.g., the points on objects 106 and 214), the surroundings within the detection range (e.g., the field of view between path 104 and 212, inclusively) can be precisely plotted (e.g., a point cloud or image can be created).

If a corresponding light pulse is not received for a particular transmitted light pulse, then it can be determined that there are no objects within a certain range of LiDAR system 100 (e.g., the max scanning distance of LiDAR system 100). For example, in FIG. 2, light pulse 206 will not have a corresponding returned light pulse (as depicted in FIG. 3) because it did not produce a scattering event along its transmission path 208 within the predetermined detection range. LiDAR system 100 (or an external system communication with LiDAR system 100) can interpret this as no object being along path 208 within the detection range of LiDAR system 100.

In FIG. 2, transmitted light pulses 102, 202, 206, 210 can be transmitted in any order, serially, in parallel, or based on other timings with respect to each other. Additionally, while FIG. 2 depicts a 1-dimensional array of transmitted light pulses, LiDAR system 100 optionally also directs similar arrays of transmitted light pulses along other planes so that a 2-dimensional array of light pulses is transmitted. This 2-dimentional array can be transmitted point-by-point, line-by-line, all at once, or in some other manner. The point cloud or image from a 1-dimensional array (e.g., a single horizontal line) will produce 2-dimensional information (e.g., (1) the horizontal transmission direction and (2) the range to objects). The point cloud or image from a 2-dimensional array will have 3-dimensional information (e.g., (1) the horizontal transmission direction, (2) the vertical transmission direction, and (3) the range to objects).

The density of points in point cloud or image from a LiDAR system 100 is equal to the number of pulses divided by the field of view. Given that the field of view is fixed, to increase the density of points generated by one set of transmission-receiving optics, the LiDAR system should fire a pulse more frequently, in other words, a light source with a higher repetition rate is needed. However, by sending pulses more frequently the farthest distance that the LiDAR system can detect may be more limited. For example, if a returned signal from a far object is received after the system transmits the next pulse, the return signals may be detected in a different order than the order in which the corresponding signals are transmitted and get mixed up if the system cannot correctly correlate the returned signals with the transmitted signals. To illustrate, consider an exemplary LiDAR system that can transmit laser pulses with a repetition rate between 500 kHz and 1 MHz. Based on the time it takes for a pulse to return to the LiDAR system and to avoid mix-up of returned pulses from consecutive pulses in conventional LiDAR design, the farthest distance the LiDAR system can detect may be 300 meters and 150 meters for 500 kHz and 1 Mhz, respectively. The density of points of a LiDAR system with 500 kHz repetition rate is half of that with 1 MHz. Thus, this example demonstrates that, if the system cannot correctly correlate returned signals that arrive out of order, increasing the repetition rate from 500 kHz to 1 Mhz (and thus improving the density of points of the system) would significantly reduce the detection range of the system.

Figure 4:
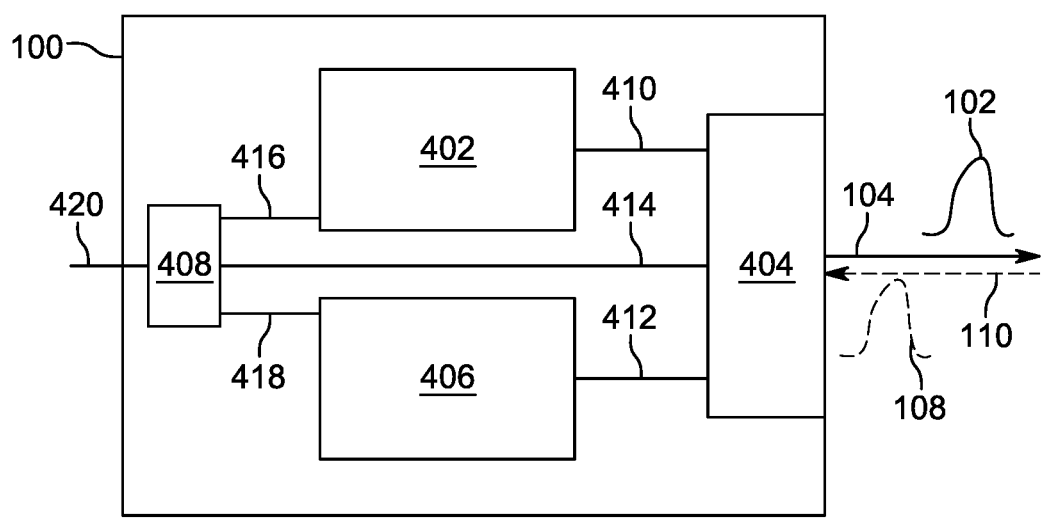
FIG. 4 depicts a logical block diagram of the exemplary LiDAR system.

FIG. 4 depicts a logical block diagram of LiDAR system 100, which includes light source 402, signal steering system 404, pulse detector 406, and controller 408. These components are coupled together using communications paths 410, 412, 414, 416, and 418. These communications paths represent communication (bidirectional or unidirectional) among the various LiDAR system components but need not be physical components themselves. While the communications paths can be implemented by one or more electrical wires, busses, or optical fibers, the communication paths can also be wireless channels or open-air optical paths so that no physical communication medium is present. For example, in one exemplary LiDAR system, communication path 410 is one or more optical fibers, communication path 412 represents an optical path, and communication paths 414, 416, 418, and 420 are all one or more electrical wires that carry electrical signals. The communications paths can also include more than one of the above types of communication mediums (e.g., they can include an optical fiber and an optical path or one or more optical fibers and one or more electrical wires).

LIDAR system 100 can also include other components not depicted in FIG. 4, such as power buses, power supplies, LED indicators, switches, etc. Additionally, other connections among components may be present, such as a direct connection between light source 402 and light detector 406 so that light detector 406 can accurately measure the time from when light source 402 transmits a light pulse until light detector 406 detects a returned light pulse.

Figure 5:
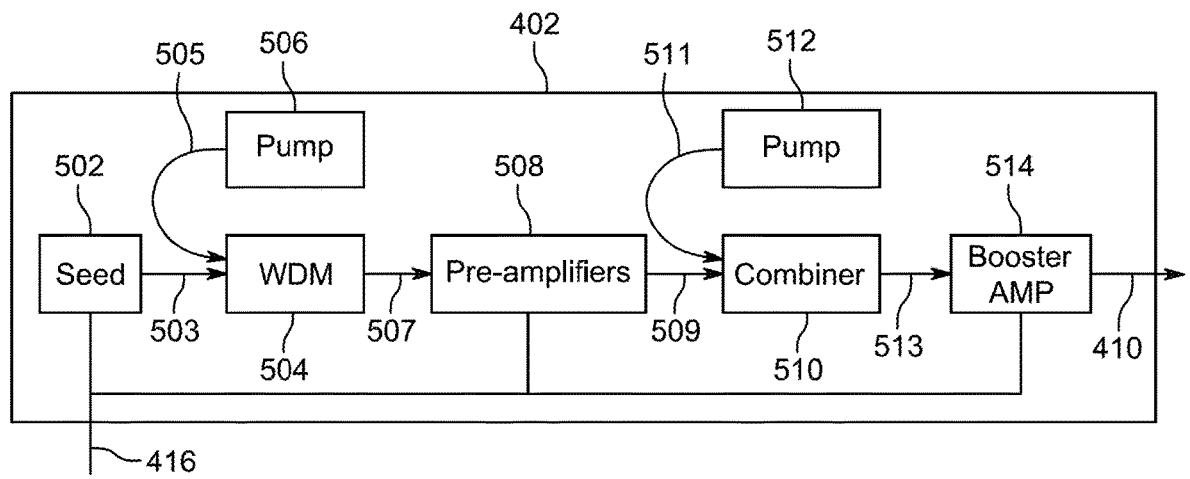
FIG. 5 depicts a light source of the exemplary LiDAR system.

FIG. 5 depicts a logical block diagram of one example of light source 402 that is based on a laser fiber, although any number of light sources with varying architecture could be used as part of the LiDAR system. Light source 402 uses seed 502 to generate initial light pulses of one or more wavelengths (e.g., 1550 nm), which are provided to wavelength-division multiplexor (WDM) 504 via fiber 503. Pump 506 also provides laser power (of a different wavelength, such as 980 nm) to WDM 504 via fiber 505. The output of WDM 504 is provided to pre-amplifiers 508 (which includes one or more amplifiers) which provides its output to combiner 510 via fiber 509. Combiner 510 also takes laser power from pump 512 via fiber 511 and provides pulses via fiber 513 to booster amplifier 514, which produces output light pulses on fiber 410. The outputted light pulses are then fed to steering system 404. In some variations, light source 402 can produce pulses of different amplitudes based on the fiber gain profile of the fiber used in the source. Communication path 416 couples light source 402 to controller 408 (FIG. 4) so that components of light source 402 can be controlled by or otherwise communicate with controller 408. Alternatively, light source 402 may include its own controller. Instead of controller 408 communicating directly with components of light source 402, a dedicated light source controller communicates with controller 408 and controls and/or communicates with the components of light source 402. Light source 402 also includes other components not shown, such as one or more power connectors, power supplies, and/or power lines.

Some other light sources include one or more laser diodes, short-cavity fiber lasers, solid-state lasers, and/or tunable external cavity diode lasers, configured to generate one or more light signals at various wavelengths. In some examples, light sources use amplifiers (e.g., pre-amps or booster amps) include a doped optical fiber amplifier, a solid-state bulk amplifier, and/or a semiconductor optical amplifier, configured to receive and amplify light signals.

Returning to FIG. 4, signal steering system 404 includes any number of components for steering light signals generated by light source 402. In some examples, signal steering system 404 may include one or more optical redirection elements (e.g., mirrors or lens) that steer light pulses (e.g., by rotating, vibrating, or directing) along a transmit path to scan the external environment. For example, these optical redirection elements may include MEMS mirrors, rotating polyhedron mirrors, or stationary mirrors to steer the transmitted pulse signals to different directions. Signal steering system 404 optionally also includes other optical components, such as dispersion optics (e.g., diffuser lenses, prisms, or gratings) to further expand the coverage of the transmitted signal in order to increase the LiDAR system 100's transmission area (i.e., field of view). In some examples, signal steering system 404 does not contain any active optical components (e.g., it does not contain any amplifiers). In some other examples, one or more of the components from light source 402, such as a booster amplifier, may be included in signal steering system 404. In some instances, signal steering system 404 can be considered a LIDAR head or LiDAR scanner.

Some implementations of signal steering systems include one or more optical redirection elements (e.g., mirrors or lens) that steers returned light signals (e.g., by rotating, vibrating, or directing) along a receive path to direct the returned light signals to the light detector. The optical redirection elements that direct light signals along the transmit and receive paths may be the same components (e.g., shared), separate components (e.g., dedicated), and/or a combination of shared and separate components. This means that in some cases the transmit and receive paths are different although they may partially overlap (or in some cases, substantially overlap).

Figure 6:
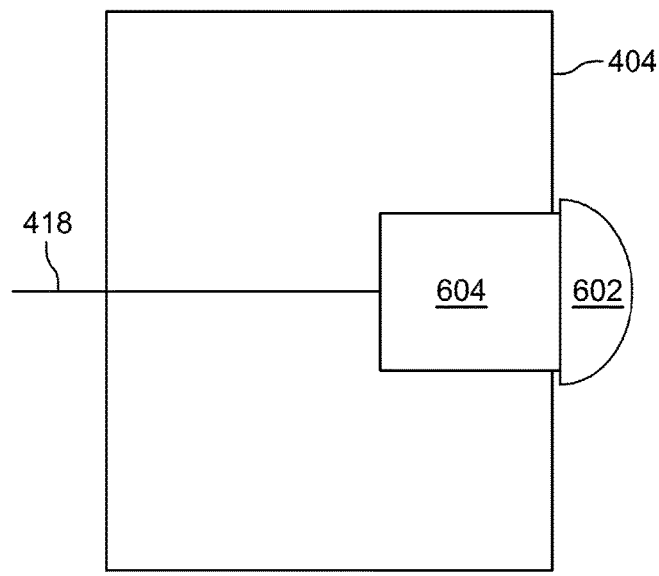
FIG. 6 depicts a light detector of the exemplary LiDAR system.

FIG. 6 depicts a logical block diagram of one possible arrangement of components in light detector 404 of LiDAR system 100 (FIG. 4). Light detector 404 includes optics 604 (e.g., a system of one or more optical lenses) and detector 602 (e.g., a charge coupled device (CCD), a photodiode, an avalanche photodiode, a photomultiplier vacuum tube, an image sensor, etc.) that is connected to controller 408 (FIG. 4) via communication path 418. The optics 604 may include one or more photo lenses to receive, focus, and direct the returned signals. Light detector 404 can include filters to selectively pass light of certain wavelengths. Light detector 404 can also include a timing circuit that measures the time from when a pulse is transmitted to when a corresponding returned pulse is detected. This data can then be transmitted to controller 408 (FIG. 4) or to other devices via communication line 418. Light detector 406 can also receive information about when light source 402 transmitted a light pulse via communication line 418 or other communications lines that are not shown (e.g., an optical fiber from light source 402 that samples transmitted light pulses). Alternatively, light detector 404 can provide signals via communication line 418 that indicate when returned light pulses are detected. Other pulse data, such as power, pulse shape, and/or wavelength, can also be communicated.

Returning to FIG. 4, controller 408 contains components for the control of LiDAR system 100 and communication with external devices that use the system. For example, controller 408 optionally includes one or more processors, memories, communication interfaces, sensors, storage devices, clocks, ASICs, FPGAs, and/or other devices that control light source 402, signal steering system 404, and/or light detector 406. In some examples, controller 408 controls the power, rate, timing, and/or other properties of light signals generated by light source 402; controls the speed, transmit direction, and/or other parameters of light steering system 404; and/or controls the sensitivity and/or other parameters of light detector 406.

Controller 408 optionally is also configured to process data received from these components. In some examples, controller determines the time it takes from transmitting a light pulse until a corresponding returned light pulse is received; determines when a returned light pulse is not received for a transmitted light pulse; determines the transmitted direction (e.g., horizontal and/or vertical information) for a transmitted/returned light pulse; determines the estimated range in a particular direction; and/or determines any other type of data relevant to LiDAR system 100.

Figure 7:
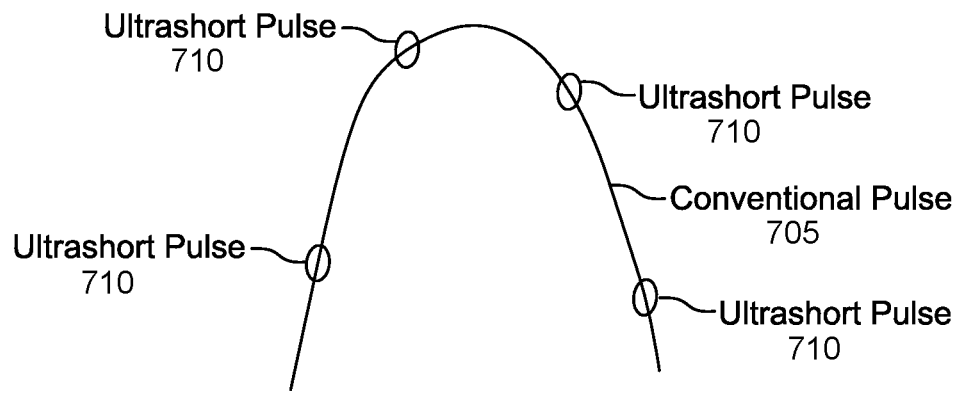
FIG. 7 shows illustrative laser pulses according to an embodiment.

FIG. 7 shows illustrative laser pulses according to an embodiment. In particular, FIG. 7 shows conventional pulse 705 and ultrashort pulses 710. Conventional pulse 705 can represent a pulse having a relatively long pulse duration (e.g., on the order of nanoseconds) as compared to the ultrashort pulses 710, which have relatively short durations (e.g., on the order of picoseconds). Ultrashort pulses 710 may be several orders of magnitudes shorter than conventional pulses 705. For example, ultrashort pulses 710 can be in the picosecond range, for example, ranging from 10 picoseconds to 900 picoseconds, or more particularly ranging between 100 and 200 picoseconds. As such, several ultrashort pulses 710 can be emitted during the span of one convention pulse 705. Conventional pulse 705 embodies higher average power than ultrashort pulses 710 that are emitted over the pulse duration of conventional pulse 705. However, each ultrashort pulse 710 has higher peak power than conventional pulse 705, but the average power consumed by ultrashort pulses 710 is much less than the average power of conventional pulse 705.

Figure 8:
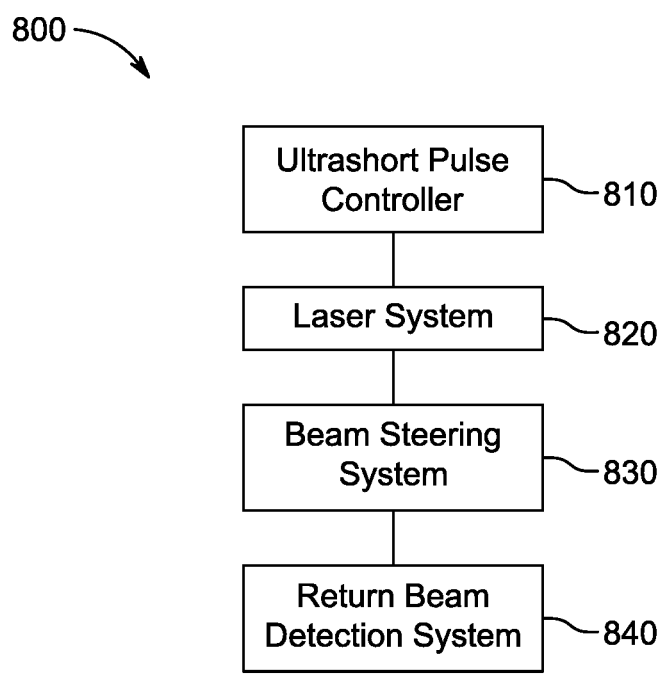
FIG. 8 shows an illustrative LiDAR system according to an embodiment.

FIG. 8 shows an illustrative LiDAR system 800 according to an embodiment. LiDAR system 800 can include ultrashort pulse controller 810, laser system 820, beam steering system 830, and return beam detection system 840. Ultrashort pulse controller 810 may control the pulse duration and power intensity of each laser pulse emitted by laser source 820, and may also control the time intervals between successively emitted laser pulses. Laser system 820 may be similar to light source 402, beam steering system may be similar to signal steering system 404, return beam detection system 840 may be similar to light detector 406. Because the ultrafast pulses are much faster than conventional pulses, special consideration may be taken into account by return beam detection system 840 to quickly and accurately process return signals. Several return beam detection circuitry system embodiments are discussed below.

Advantages of using ultrashort pulses is that it reduces average power consumption by the laser. In addition, the ultrashort pulses may enable the size of beam steering system 830 to shrink. For example, in one embodiment, a 200 picosecond ultrashort pulse may enable the receiving aperture of beam steering system 830 to be reduced down to 200 mm$^2$ and power consumption to be reduced down to less than 1 W whereas a 4 ns pulse may require that of beam steering system 830 to be sized to approximately 600 mm$^2$ and power consumption to be more than 10 W. Yet another advantage of using ultra short pulses is that various electronics such as light detecting electronics can be shrunk compared to the size of such electronics needed for conventional light pulses.

Figure 9:
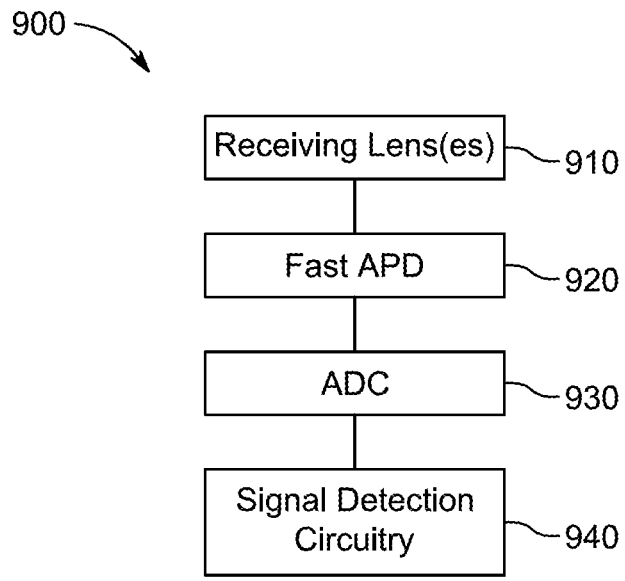
FIG. 9 shows illustrative return beam detection system according to an embodiment.

FIG. 9 shows illustrative return beam detection system 900 according to an embodiment. System 900 can include receiving lenses 910, fast avalanche photo diode (APD) 920, analog-to-digital converter (ADC) 930, and signal detection circuitry 940. The fast APD 920 monitors for return pulses. Detected return pulses are sent to ADC 930 for conversion from an analog signal to a digital signal. That digital signal can be compared to a threshold by signal detection circuitry 940 to determine whether a return pulse has been detected.

Figure 10:
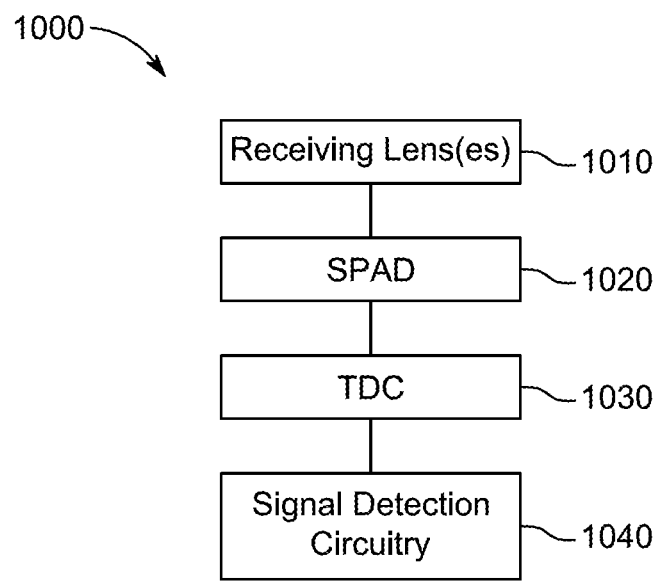
FIG. 10 shows another illustrative return beam detection system according to an embodiment.
Figure 11:
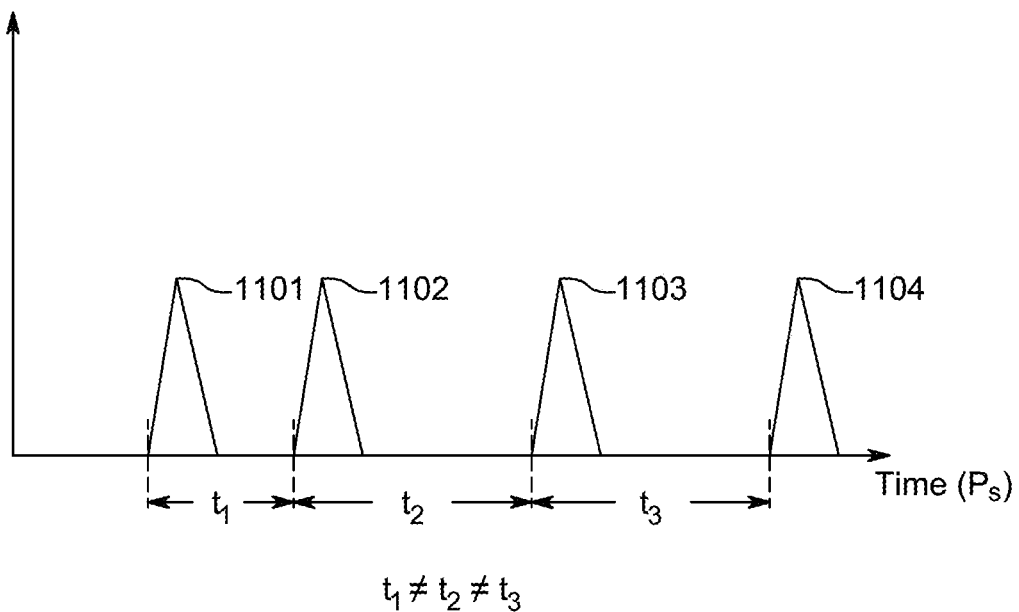
FIG. 11 shows an illustrate sequence of ultrashort pulses according to an embodiment.
Figure 12:
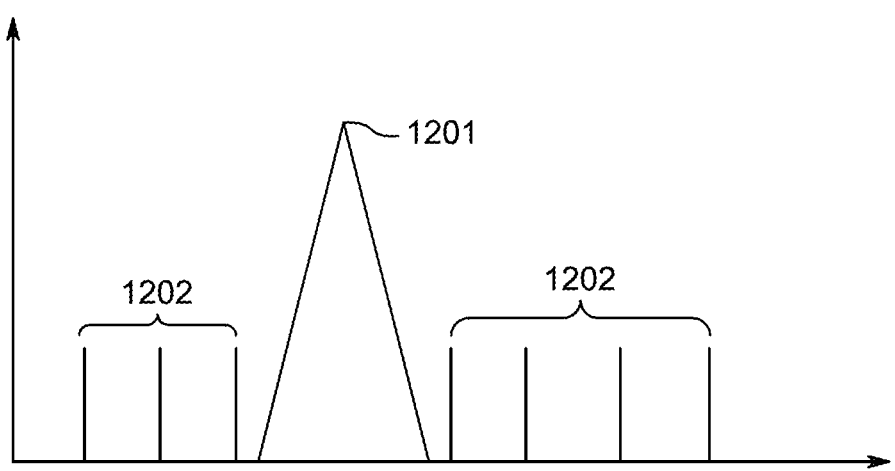
FIG. 12 shows a correlated return pulse signal surround by noise signals according to an embodiment.

FIG. 10 shows illustrative return beam detection system 1000 according to an embodiment. System 1000 can include receiving lenses 1010, single photon avalanche diode (SPAD) detector 1020, time-to-digital converter (TDC) 1030, and signal detection circuitry 1040. SPAD detector 1020 is very sensitive and generates an output in response to return signals and noise (e.g., ambient sunlight, etc.). TDC 1030 determines the time period between successive outputs generated by SPAD detector 1020. The determined time periods are provided to signal detection circuitry 1040. Signal detection circuitry 1040 can evaluate the determined time periods to assess whether a return pulse has been detected. Using TDC 1030 (as opposed to an ADC) eliminates an intensity measurement of the return pulses, and uses a time-dependent measurement of the return pulses. In order to combat the noise issue, ultrashort pulse controller (e.g., controller 810) may instruct the laser source to emit successive ultrashort pulses with different periods. For example, FIG. 11 shows an illustrative sequence of ultrashort pulses 1101-1104 that are successively emitted at different periods or time delays T1-T3, where T1≠T2≠T3. By varying the periods, signal detection circuitry 1040 can more readily discern whether SPAD signals belong to a real return signal or noise. This can be done by correlating the determined time periods with the varying periods. FIG. 12 shows a correlated return pulse signal 1201 surround by noise signals 1202. In addition, by varying the periods of successive laser pulses, signal detection circuitry 1040 can detect return pulses within 2-3 ms as opposed to techniques that do not dither the successive laser pulses, which can take 100 ms or more to detect return pulses.

System 1000 may not be able to determine intensity of the return light pulse because it is set up to detect time delays between returned pulses. If desired, system 1000 may be used in combination with a camera that can be used to obtain intensity information related to the light pulse.

In some embodiments, the SPAD detector can be based on InGaAs, which can detect light in the 900-1700 nm wavelengths. In another embodiment the SPAD detector can be based on a silicon photo multitube (SiPM), which can detect light in the 400-1050 nm wavelengths.

Figure 13:
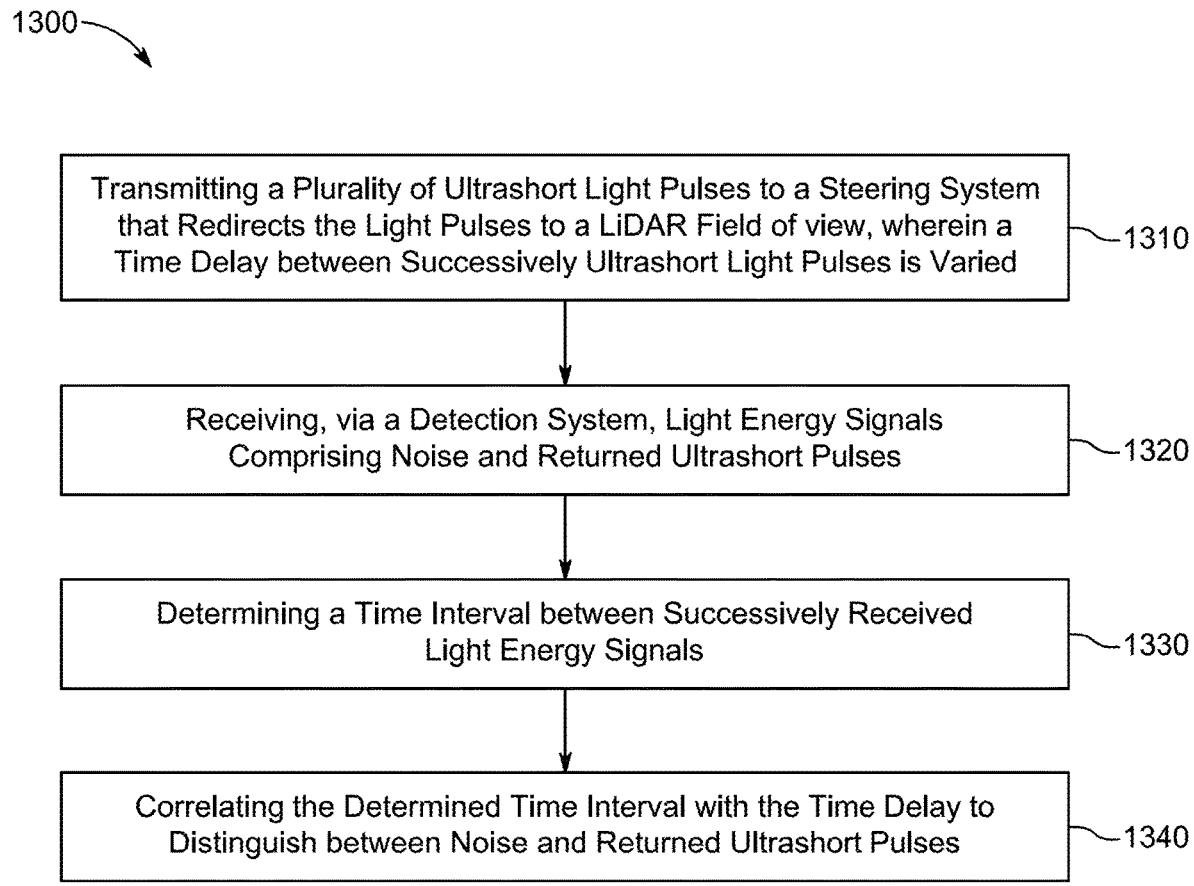
FIG. 13 shows an illustrative process according to an embodiment.

FIG. 13 shows illustrative process 1300 according to an embodiment. Starting at step 1310, a plurality of ultrashort light pulses can be transmitted to a steering system that redirects the light pulses to a LiDAR field of view, wherein a time delay between successively transmitted ultrashort light pulses is varied. At step 1320, light energy signals are received via a detection system. The light energy signals can include at least one of noise and returned ultrashort pulses.

At step 1330, a time interval between successively received light energy signals is determined. At step 1340, the determined time interval can be correlated with the time delay to distinguish between noise and returned ultrashort pulses.

It should be understood that the steps shown in FIG. 13 are merely illustrative and that additional steps may be added, that some steps may be omitted, and that some steps may rearranged.

Figure 14:
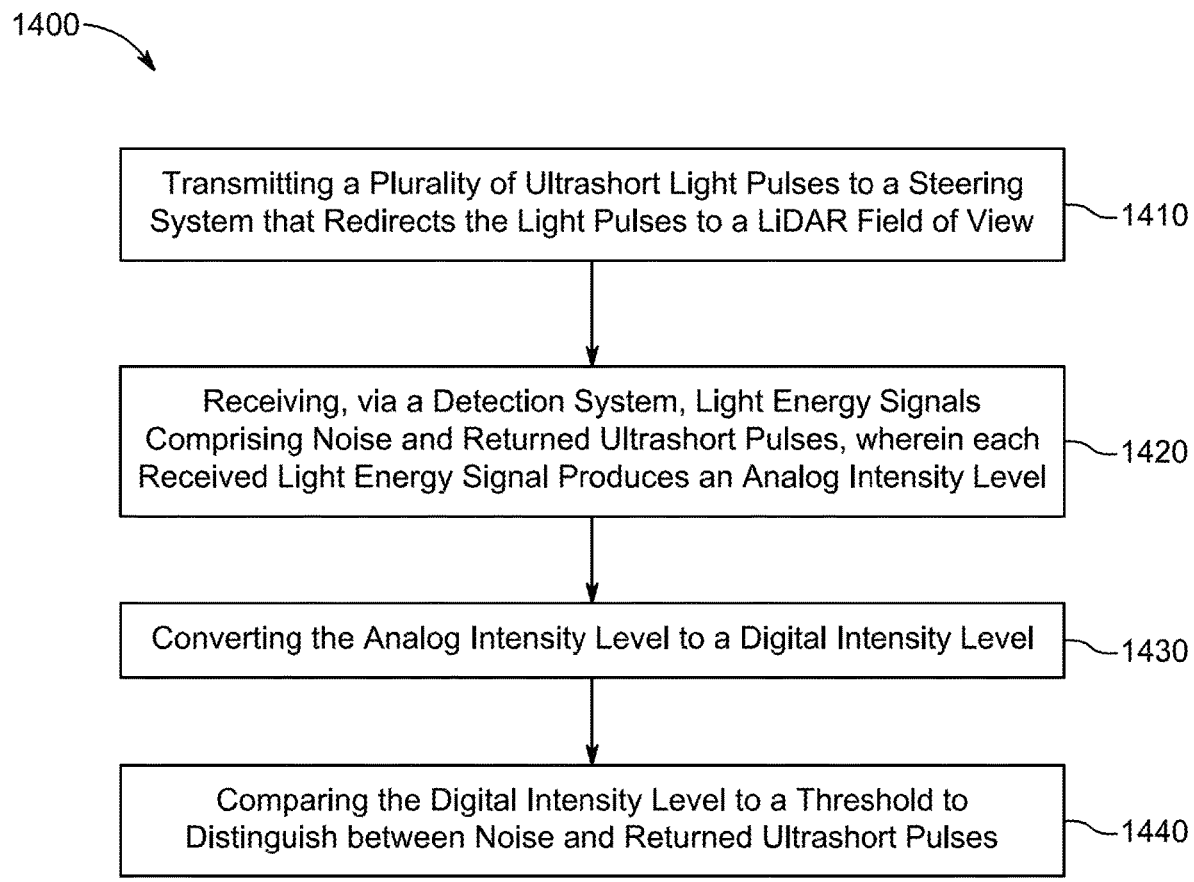
FIG. 14 shows an illustrative process according to an embodiment.

FIG. 14 shows illustrative process 1400 according to an embodiment. Starting at step 1410, a plurality of ultrashort light pulses can be transmitted to a steering system that redirects the light pulses to a LiDAR field of view. At step 1420, light energy signals are received via a detection system. The light energy signals can include noise and returned ultrashort pulses, wherein each received light energy signal produces an analog intensity level. At step 1430, the analog intensity level is converted to a digital intensity level. At step 1440, the digital intensity level is compared to a threshold to distinguish between noise and returned ultrashort pulses.

It should be understood that the steps shown in FIG. 14 are merely illustrative and that additional steps may be added, that some steps may be omitted, and that some steps may rearranged.

Figure 15:
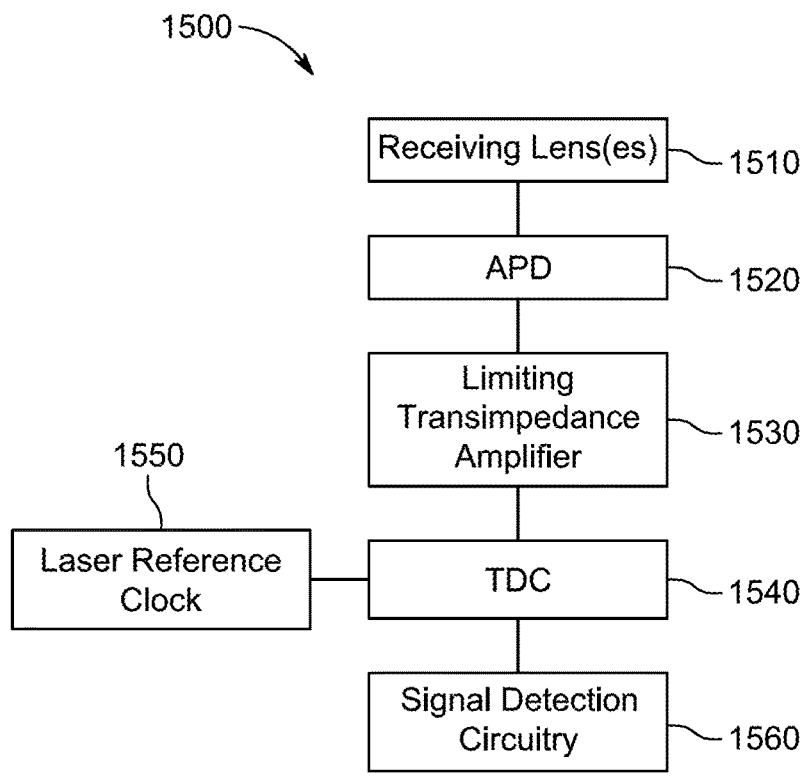
FIG. 15 shows yet another illustrative return beam detection system according to an embodiment.

FIG. 15 shows illustrative return beam detection system 1500 according to an embodiment. System 1500 can include receiving lenses 1510, avalanche photo diode (APD) detector 1520, limiting transimpedance amplifier (LTA) 1530, time-to-digital converter (TDC) 1540, laser reference clock 1550, and signal detection circuitry 1560. APD 1520 monitors for return pulses. APD 1520 produces a current signal based on the detected return pulse. The current signal may have a period approximately equal to the ultrashort pulse. LTA 1530 converts the current signal obtained by APD 1520 into a square wave signal. The square wave signal has a period that is approximately the same as the period of the light pulse received by receiving lens 1510. The square wave signal is provided to TDC 1540. TDC 1540 also receives laser reference clock 1550. Laser reference clock 1550 corresponds to transmission of each light pulse by the laser system (not shown). TDC 1540 is able to determine a time delay between a reference clock and the rising edge of square wave for any given light pulse. Each light pulse includes the originating light pulse being emitted by the laser source and a return pulse. Each originating light pulse corresponds to the laser reference clock 1550 and each return pulse is represented by the square wave generated by the LTA 1530. The time delay between the reference clock and the square wave is used to calculate the distance of the object responsible for returning the return pulse.

Figure 16:
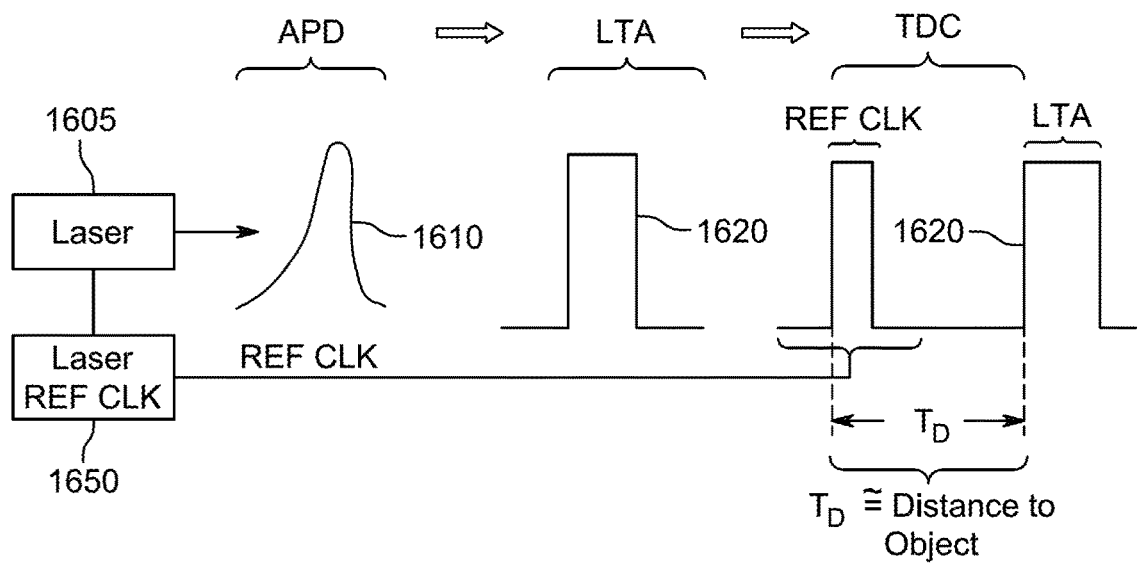
FIG. 16 shows an illustrative timing diagram according to an embodiment.

FIG. 16 shows an illustrative timing diagram according to an embodiment. As shown, laser source 1605 transmits a laser pulse that corresponds to REF CLK pulse transmitted by laser reference clock 1650. A return pulse, reflected by an object in the LiDAR system's field of view, is detected by the APD, which produces illustrative current signal 1610, which is sent to the LTA. The LTA converts current signal 1610 into square wave signal 1620. Square signal 1620 and REF CLK are compared by the TDC to determine the time delay (ta) between square wave signal 1620 and REF CLK. The time delay can be used to determine the distance to the object responsible for returning the return pulse.

Figure 17:
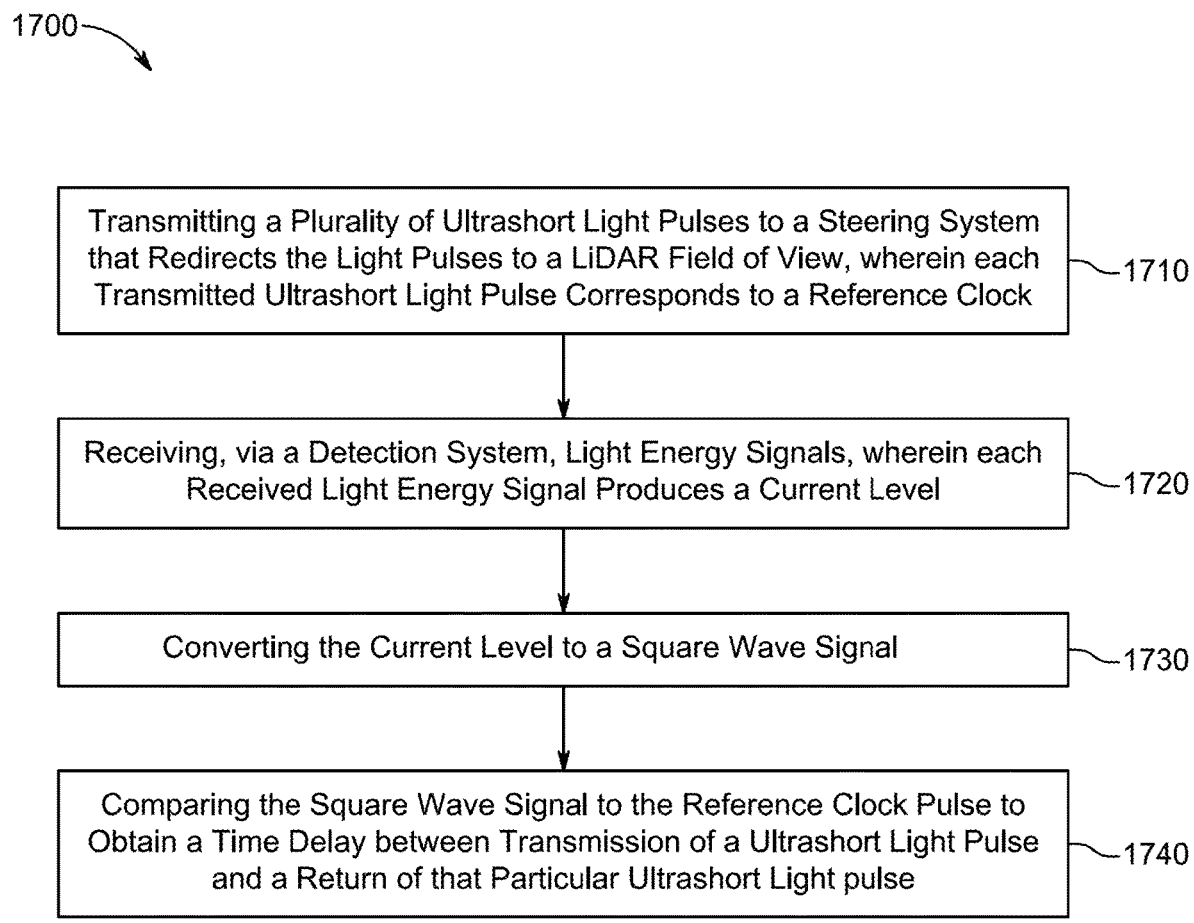
FIG. 17 shows illustrative process according to an embodiment.

FIG. 17 shows an illustrative process 1700 according to an embodiment. Process 1700 may be implemented in system 1500. Starting at step 1710, a plurality of ultrashort light pulses can be transmitted to a steering system that redirects the light pulses to a LiDAR field of view, wherein each transmitted ultrashort light pulse corresponds to a reference clock. At step 1720, light energy signals are received via a detection system, wherein each received light energy signal produces a current level. For example, ADP 1520 may produce a current level based on the returned ultrashort pulse. At step 1730, the current level is converted to a square wave signal. For example, LTA 1530 may generate the square wave signal. At step 1740, the square wave signal is compared to the reference clock pulse to obtain a time delay between transmission of an ultrashort light pulse and a return of that particular ultrashort light pulse. For example, TDC 1540 may determine the time delay.

It should be understood that the steps shown in FIG. 17 are merely illustrative and that additional steps may be added, that some steps may be omitted, and that some steps may rearranged.

Various exemplary embodiments are described herein. Reference is made to these examples in a non-limiting sense. They are provided to illustrate more broadly applicable aspects of the disclosed technology. Various changes may be made and equivalents may be substituted without departing from the true spirit and scope of the various embodiments. In addition, many modifications may be made to adapt a particular situation, material, composition of matter, process, process act(s) or step(s) to the objective(s), spirit or scope of the various embodiments. Further, as will be appreciated by those with skill in the art, each of the individual variations described and illustrated herein has discrete components and features which may be readily separated from or combined with the features of any of the other several embodiments without departing from the scope or spirit of the various embodiments.

The invention claimed is:

1. A light detection and ranging (LiDAR) system comprising:
   a light source configured to output a plurality of light pulses;
   a controller configured to:
      control pulse duration of each of the light pulses,
      control a plurality of time delays including variable time delays such that at least two of the plurality of time delays are different among successive light pulses, and
      select, in a pseudo-random manner, the plurality of time delays between the successive light pulses, wherein the pulse duration of each of the light pulses is substantially the same and is characterized as an ultrashort light pulse, and wherein at least one ultrashort light pulse of the light pulses is emitted during a span of one non-ultrashort light pulse having a pulse duration on the order of nanosecond;
   a steering system configured to control a scanning direction of each ultrashort light pulse to a particular location within a LiDAR field-of-view (FOV); and
   a detection system configured to monitor for returned ultrashort pulses and determine one or more time durations between successive outputs of a detector of the detection system,
   wherein the controller is further configured to correlate the determined one or more time durations with the variable time delays to distinguish between noise and the returned ultrashort pulses.

2. The LiDAR system of claim 1, wherein the detection system comprises:
   at least one receiving lens;

the detector comprising a single photon avalanche diode (SPAD) detector; and a time-to-digital converter (TDC).

3. The LiDAR system of claim 2, wherein the SPAD detector is configured to generate one or more output signals in response to light energy received through the at least one receiving lens, and wherein the TDC is configured to determine one or more time durations between successive outputs of the SPAD detector.

4. The LiDAR system of claim 1, wherein the pulse duration of an ultrashort light pulse is on the order of picoseconds.

5. The LiDAR system of claim 1, wherein the pulse duration of an ultrashort light pulse ranges between 10 picoseconds and 900 picoseconds.

6. The LiDAR system of claim 1, wherein the pulse duration of an ultrashort light pulse ranges between 100 picoseconds and 200 picoseconds.

7. The LiDAR system of claim 1, wherein the detection system comprises:
at least one receiving lens;
the detector comprising an avalanche photo diode (APD) detector; and
an analog-to-digital converter (ADC).

8. The LiDAR system of claim 7, wherein the APD detector is configured to generate an output signal proportional to light energy received through the at least one receiving lens, and wherein the ADC is configured to convert the output signal to a digital signal.

9. The LiDAR system of claim 8, wherein the controller is configured to compare the digital signal to a threshold to determine whether a returned ultrashort pulse has been received.

10. The LiDAR system of claim 1, wherein the detection system comprises:
at least one receiving lens;
the detector comprising an avalanche photo diode (APD) detector, wherein the APD detector produces a current signal in response to a returned ultrashort pulse;
a limiting transimpedance amplifier (LTA) configured to generate a square wave signal based on the current signal; and
a time-to-digital converter (TDC).

11. The LiDAR system of claim 10, wherein at least one of the plurality of time delays between the successive light pulses is provided with a reference clock to the TDC, and wherein the TDC determines a time delay between the reference clock and the square wave signal that is used to determine a distance to an object that returned the returned ultrashort pulse.

12. A method for using a light detection and ranging (LiDAR) system, comprising:
transmitting a plurality of ultrashort light pulses to a steering system that redirects the ultrashort light pulses to a field of view of the LiDAR system,
wherein pulse duration of each of the ultrashort light pulses is substantially the same and is controlled by a controller of the LIDAR system,
wherein a plurality of time delays between successive ultrashort light pulses are variable time delays controlled by the controller of the LiDAR system such that at least two of the time delays are different among the successive ultrashort light pulses,
wherein the plurality of time delays between the successive ultrashort light pulses are selected by the controller of the LiDAR system in a pseudo-random manner,
and wherein at least one ultrashort light pulse of the plurality of ultrashort light pulses is emitted during a span of one non-ultrashort light pulse having a pulse duration on the order of nanosecond;
receiving, via a detection system, light energy signals comprising at least one of noise and returned ultrashort pulses;
determining one or more time intervals between successively received light energy signals; and
correlating the determined one or more time intervals with the plurality of variable time delays to distinguish between noise and returned ultrashort pulses.

13. The method of claim 12, wherein the ultrashort light pulses range between 10 picoseconds and 900 picoseconds.

14. The method of claim 12, wherein the ultrashort light pulses range between 100 picoseconds and 200 picoseconds.

15. A method for using a light detection and ranging (LiDAR) system, comprising:
transmitting a plurality of ultrashort light pulses to a steering system that redirects the ultrashort light pulses to a field of view of the LiDAR system,
wherein pulse duration of each of the ultrashort light pulses is substantially the same and is controlled by a controller of the LIDAR system,
wherein a plurality of time delays between successive ultrashort light pulses are variable time delays controlled by the controller of the LiDAR system such that at least two of the time delays are different among the successive ultrashort light pulses,
wherein the plurality of time delays between the successive ultrashort light pulses are selected by the controller of the LiDAR system in a pseudo-random manner,
and wherein at least one ultrashort light pulse of the plurality of ultrashort light pulses is emitted during a span of one non-ultrashort light pulse having a pulse duration on the order of nanosecond;
receiving, via a detection system, light energy signals comprising noise and returned ultrashort pulses, wherein each of the received light energy signal produces an analog intensity level;
converting the analog intensity level to a digital intensity level; and
distinguishing between noise and returned ultrashort pulses based on the digital intensity level and the variable time delays.

16. The method of claim 15, wherein the ultrashort light pulses range between 10 picoseconds and 900 picoseconds.

17. The method of claim 15, wherein the ultrashort light pulses range between 100 picoseconds and 200 picoseconds.

18. A method for using a light detection and ranging (LiDAR) system, comprising:
transmitting a plurality of ultrashort light pulses to a steering system that redirects the light pulses to a field of view of the LiDAR system,
wherein pulse duration of each of the ultrashort light pulses is substantially the same and is controlled by a controller of the LIDAR system,
wherein each of the transmitted ultrashort light pulse corresponds to a reference clock, wherein a plurality of time delays between successive ultrashort light pulses are variable time delays controlled by a controller of the LiDAR system such that at least two of the time delays are different among the successive ultrashort light pulses, wherein the plurality of time delays between the successive ultrashort light pulses are selected by the controller of the LiDAR system in a pseudo-random manner, and wherein at least one ultrashort light pulse of the plurality of ultrashort light pulses is emitted during a span of one non-ultrashort light pulse having a pulse duration on the order of nanosecond;

receiving, via a detection system, light energy signals, and wherein each of the received light energy signals produces a current level;

converting the current level to a square wave signal; and obtaining, based on the square wave signal and the variable time delays, a time delay between transmission of an ultrashort light pulse and a corresponding return light pulse.

19. The method of claim 18, wherein the ultrashort light pulses range between 10 picoseconds and 900 picoseconds.

20. The method of claim 18, wherein the ultrashort light pulses range between 100 picoseconds and 200 picoseconds.

21. The LiDAR system of claim 1, wherein the controller is further configured to control the pulse duration of each of the light pulses to be ultrashort such that a size of a receiving aperture of the steering system is reduced compared to if the light pulses are non-ultrashort pulse.

22. The LiDAR system of claim 1, wherein the controller is further configured to control the pulse duration of each of the light pulses to be ultrashort such that average power consumption by the light source is reduced compared to if the light pulses are non-ultrashort pulse.

* * * * *